United States Patent
Kennedy

[11] Patent Number: 5,882,029
[45] Date of Patent: Mar. 16, 1999

[54] TRAILER HITCH ALIGNMENT AND LIFTING DEVICE

[75] Inventor: Steven D. Kennedy, Boise, Id.

[73] Assignees: Charles F. Leonard; Shirley Lee Leonard, both of Star, Id.

[21] Appl. No.: 914,241

[22] Filed: Aug. 18, 1997

[51] Int. Cl.⁶ .................................................... B60D 1/06
[52] U.S. Cl. .......................................... 280/477; 280/511
[58] Field of Search ................................... 280/477, 511; 254/325, 334, 274, 276

[56] References Cited

U.S. PATENT DOCUMENTS

| | | | |
|---|---|---|---|
| 3,201,144 | 8/1965 | Smyser | 280/477 |
| 3,767,230 | 10/1973 | DeVries | 280/477 |
| 3,938,122 | 2/1976 | Mangus | 280/477 |
| 4,173,353 | 11/1979 | Steele | 280/477 |
| 4,186,938 | 2/1980 | Youngblood | 280/402 |
| 4,903,978 | 2/1990 | Schrum | 280/477 |
| 5,005,852 | 4/1991 | Smyly | 280/477 |
| 5,009,445 | 4/1991 | Williams, Jr. | 280/477 |
| 5,080,386 | 1/1992 | Lazar | 280/477 |
| 5,085,408 | 2/1992 | Norton et al. | 254/325 |
| 5,314,202 | 5/1994 | Wilkins | 280/511 |
| 5,405,160 | 4/1995 | Weaver | 280/477 |

FOREIGN PATENT DOCUMENTS

| | | | |
|---|---|---|---|
| 872433 | 2/1953 | Germany | 280/477 |
| 477180 | 8/1936 | United Kingdom . | |
| PCT/GB90/ 00383 | 3/1990 | WIPO . | |

*Primary Examiner*—Anne Marie Boehler
*Assistant Examiner*—Michael Cuff
*Attorney, Agent, or Firm*—Ken J. Pedersen; Barbara S. Pedersen

[57] ABSTRACT

A device for aligning the tongue and hitch first portion on a trailer (trailer hitch) with the receiver and hitch second portion (ball) on a towing vehicle, and for lifting the trailer hitch on and off the ball. The device comprises a vertical post on the towing vehicle in front of and in close proximity to the ball. The post has a pivotal arm which can rotate from a vertical position to a rearwardly inclined position. The post has a cable guide at or near its top surface. The pivotal arm also has a cable guide at or near its top surface. The cable guides are for receiving and guiding a cable connected to a winch on the tongue of the trailer. The tongue of the trailer also has a cable guide in front of the winch near the front end of the tongue. The invention has two (2) modes of operation (please refer to FIGS. 1 and 2): 1) on-loading the trailer hitch onto the ball; and, 2) off-loading the trailer hitch from the ball. During on-loading, slack cable from the winch is directed through the tongue cable guide, over the pivotal arm cable guide, over the post cable guide and is connected to a cable hook receiver low on the post. During off-loading, the post cable guide is not utilized and the cable passes from the winch, through the tongue cable guide, over the pivotal arm cable guide and is connected to the cable hook receiver or to the vehicle.

5 Claims, 3 Drawing Sheets

TRAILER HITCH ALIGNMENT AND LIFTING DEVICE

BACKGROUND OF THE INVENTION

1. Field of the Invention

This invention relates generally to hitches for trailers, wagons and other towed vehicles. More specifically, this invention relates to an apparatus for and method of easily and quickly aligning the tongue and hitch first portion on the trailer (trailer hitch) with the receiver and hitch second portion, usually a ball on a post (ball), on the towing vehicle, and for lifting the trailer hitch on and off the ball.

2. Related Art

U.S. Pat. No. 5,009,445 (Williams, Jr.) discloses a trailer hitch with a winch and cable which passes around a pulley located below the tongue. The cable is provided with a hook which is connected to a ball mount.

U.S. Pat. No. 5,080,386 (Lazar) discloses a self-aligning and self-connecting ball and socket hitch. The hitch ball has a housing with rearwardly diverging walls which guide the tongue on the towed vehicle to align the tongue with the ball. Also, a vertically inclined slide plate engaging the hitch ball lifts the tongue up and over the ball.

U.S. Pat. No. 5,085,408 (Norton, et al.) discloses a trailer connecting guide which comprises a winch, a winch cable guide, and a pulley on the trailer tongue. In operation, the winch cable is connected to the towing vehicle near the ball post, passed around the pulley, and through the cable guide.

U.S. Pat. No. 5,405,160 (Weaver) discloses a trailer hitch with a winch and a multiposition arm pivotally attached to the underside of the tongue of the trailer forward of the winch. In operation, the arm is locked into a downwardly extending position, and the winch strap passes over it to lift the tongue over the ball.

British Patent #477,180 (Scamell, et al.) Discloses an improved towing hook for vehicles wherein a winch cable passes between a set of rollers above and forward of a pivotal hook hitch on the towing vehicle.

PCT Published Application #WO 90/10550 (Suitor) discloses a trailer tongue with a mounting plate carrying a winch. The winch is located beneath a socket hitch which has a downwardly extending cable guide through which the cable passes when it is connected to the ball post.

Still, there is a need in the trailer hitch industry for a safe, effective and durable hitch alignment and lifting device. This invention addresses that need.

SUMMARY OF THE INVENTION

The invention is a device for aligning the tongue and hitch first portion on the trailer (trailer hitch) with the receiver and hitch second portion (ball) on the towing vehicle, and for lifting the trailer hitch on and off the ball. The device comprises a vertical post on or connected to the towing vehicle in front of and in close proximity to the ball. The post has a pivotal arm which can rotate from a vertical position to a rearwardly inclined position. The post has a cable guide at or near its top surface. The pivotal arm also has a cable guide at or near its top surface. The cable guides are for receiving and guiding a cable connected to a winch on the tongue of the trailer. The tongue of the trailer also has a cable guide in front of the winch near the front end of the tongue.

The invention has two (2) modes of operation (please refer to FIGS. 1 and 2): 1) on-loading the trailer hitch onto the ball; and, 2) off-loading the trailer hitch from the ball. During on-loading, slack cable from the winch is directed through the tongue cable guide, over the pivotal arm cable guide, over the post cable guide and connected to a cable hook receiver low on the post, or to the vehicle. This way, when slack is taken out of the cable by operating the winch, the tongue and trailer hitch are pulled up to contact the pivotal arm which itself is pulled up to nearly a vertical position within the vertical post. Here, the trailer hitch is directly above the ball, and when some slack is let back into the cable, the trailer hitch settles down on top of the ball.

During off-loading, the post cable guide is not utilized and the cable passes from the winch, through the tongue cable guide, over the pivotal arm cable guide and is connected to the cable hook receiver or to the vehicle. This way, when slack is taken out of the cable by operating the winch, the tongue and trailer hitch are pulled up off the ball, and the pivotal arm rotates rearwardly because it is not held back by the cable passing over the post cable guide. Then, when some slack is let into the cable, the pivotal arm rotates further rearwardly, and tongue and trailer hitch settle down behind the ball.

DESCRIPTION OF THE PREFERRED EMBODIMENTS

Figure 1:
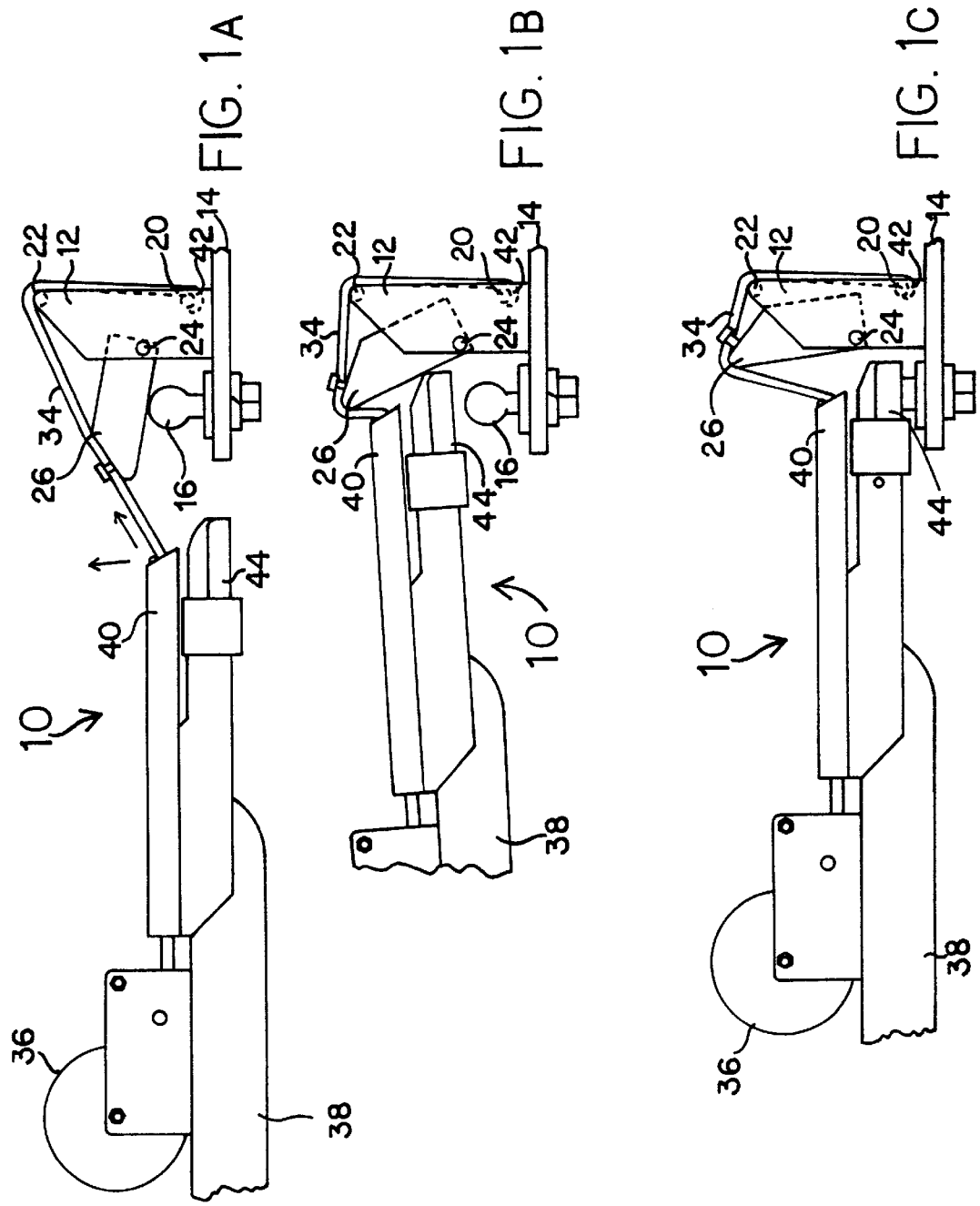
FIG. 1—A, B and C are partial, side schematic sequential views of an embodiment of the invention during the on-loading mode of operation.
Figure 2:
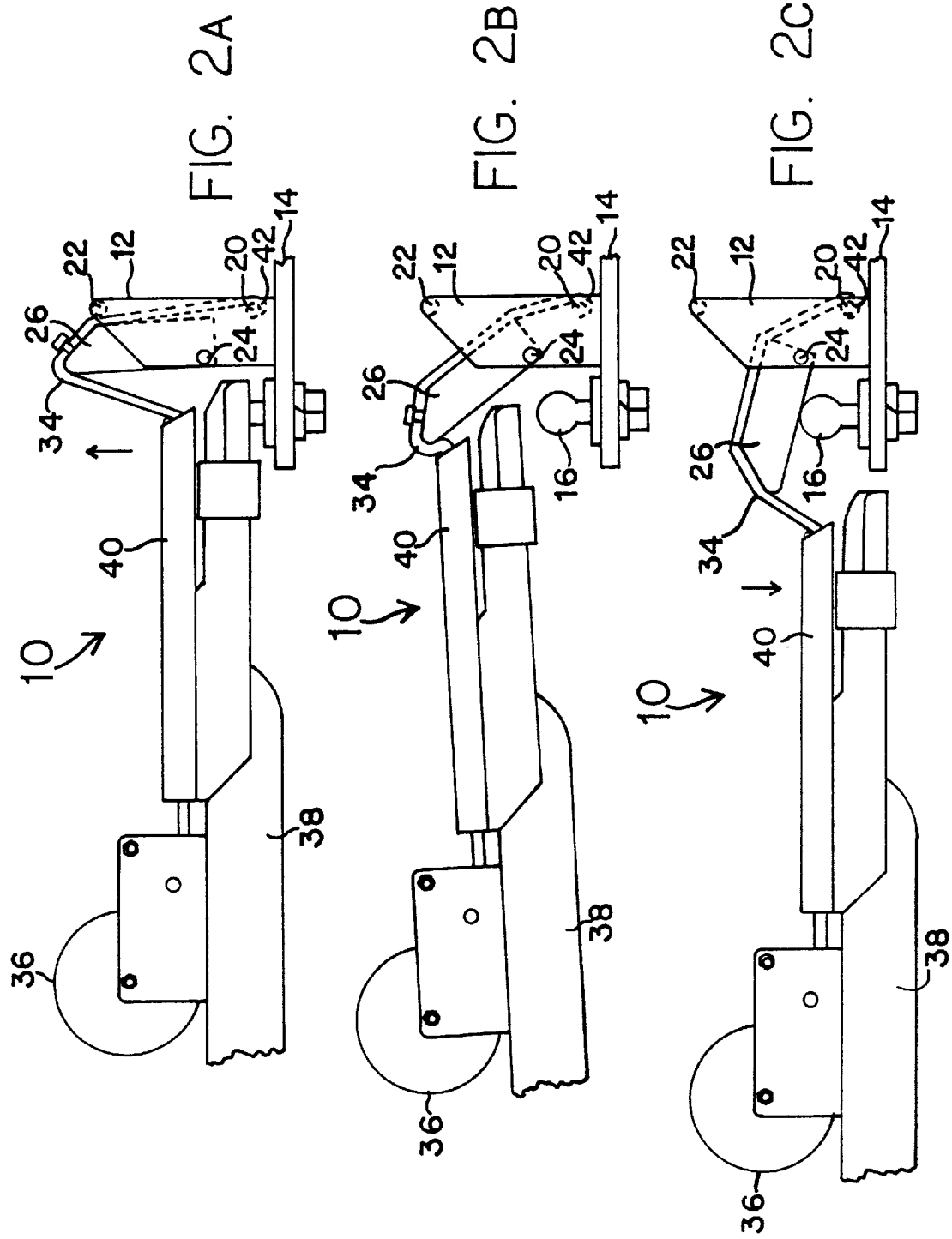
FIG. 2—A, B and C are partial, side schematic sequential views of the embodiment of FIG. 1, but during the off-loading mode of operation.
Figure 3:
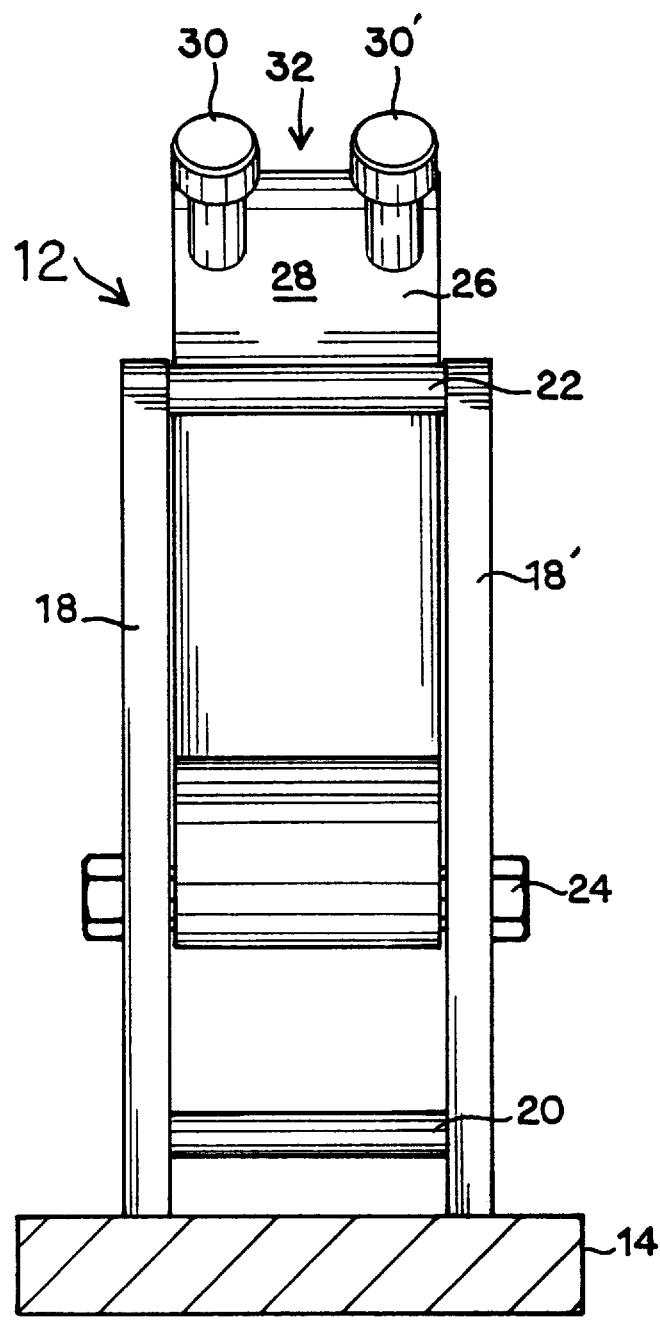
FIG. 3 is a view from the back of the towing vehicle looking towards the vertical post component of the embodiment of FIGS. 1 and 2, with the pivotal arm in the post in the vertical position.

Referring to the Figures, there is depicted generally one, but not the only, embodiment of the invention 10. In this description, directions are indicated relative to the towing vehicle.

The invention is an apparatus 10 for aligning the tongue and hitch first portion on the trailer (trailer hitch) with the receiver and hitch second portion (ball) on the towing vehicle, and for lifting the trailer hitch on and off the ball. The apparatus comprises a vertical post 12 on or connected to the towing vehicle and in front of and in close proximity to the ball. Preferably, post 12 is on a ball hitch plate 14 about two (2) inches in front of hitch ball 16 when the ball is two (2) inches in diameter. Post 12 may be permanently welded to plate 14, or it may be temporarily attached, with bolts, for example, so that it may be easily removed when not in use. This way, when post 12 is removed, it will not interfere with, for example, the tailgate when the towing vehicle is a pick-up truck.

Preferably, vertical post 12 comprises two (2) sturdy, spaced-apart, parallel, vertically upstanding plates 18 and 18' welded at their bottoms to hitch plate 14 and having between them along their length lower cable hook receiver 20, upper post cable guide 22 and pivot bolt 24 for pivotal arm 26.

Vertical post 12 has lower cable hook receiver 20 extending horizontally between plates 18 and 18' near the bottom front of post 12. Hook receiver 20 is a sturdy steel rod, and is located to effectively receive and secure a hook on the end of the cable from the winch during operation of the invention. Receiver 20 may also be located on the front top of plate 14, or even on the towed vehicle, as long as its location permits proper interaction with the post cable guide 22 during on-loading, and with the pivotal arm 26 during off-loading.

Vertical post 12 also has post cable guide 22 extending horizontally between plates 18 and 18' at or near its top surface near the back of post 12. Post cable guide 22 is a sturdy steel rod, and is located to effectively direct the angle of forces in the cable over the top of post 12 during the on-loading operation. Post cable guide 22 is not used during the off-loading operation.

Vertical post 12 also has in it pivot bolt 24 for pivot arm 26, the bolt 24 extending horizontally between plates 18 and 18' near the middle back of post 12. Pivot bolt 24 is pictured as a sturdy steel bolt with nuts on each end, and is located to permit the rotation of pivotal arm 26 from a vertical position to a rearwardly inclined position.

Vertical post 12 has in it extending vertically between plates 18 and 18' pivotal arm 26 which pivots at bolt 24 from a vertical position where its limit is post cable guide 22, to a rearwardly inclined position where it rests on top of hitch ball 16 at the limit of the incline. On its top surface 28, pivot arm 26 has two (2) upwardly extending arm cable guide posts 30 and 30'. On surface 28 of pivotal arm 26, between arm cable guide posts 30 and 30', is the arm cable guide 32. Guide 32 receives and secures the cable from sideways slippage during the on-loading and off-loading operations as pivotal arm 26 rotates from the inclined position to the vertical position and back.

During use, the invention has two (2) modes of operation: 1) on-loading, and 2) off-loading. During on-loading, cable 34 from winch 36 on tongue 38 is directed through tongue cable guide 40. Cable 34 may be a metal cable or chain, or fiber rope or strap. On its free end cable 34 has a hook 42. Hook 42 is for being secured to lower cable hook receiver 20 on post 12 during operation of the invention. Winch 36 may be manually or motor driven. Winch 36 is for taking out and letting in slack in cable 34 during operation of the invention. Tongue 38 is connected to the trailer or other towed vehicle. Tongue cable guide 40 is in front of winch 36 near the front end of the tongue 38. Tongue cable guide 40 is for directing the angle of forces in cable 34 during the on-loading and off-loading operations. Cable guide 40 may be the long tube described in the drawings or a single ring attached to tongue 38 or even attached to the top of socket 44. Preferably, tongue cable guide 40 is in close proximity to trailer hitch socket 44. This way, as tongue cable guide 40 directs the forces during operation of the invention, its location close to trailer hitch socket 44 controls the movement of socket 44 on and off ball 16.

Cable 34 from tongue cable guide 40 is directed over pivotal arm cable guide 32, over the post cable guide 22 and is connected to lower cable hook receiver 20 during the on-loading operation. When slack is taken out of cable 34 by operation of winch 36, the tongue 38 and trailer hitch socket 44 are pulled up to contact the back side of pivotal arm 26 which itself is pulled up to nearly a vertical position within the vertical post 12. Here, the trailer hitch socket 44 is directly above the ball 16, and when some slack is let back into the cable 34, the trailer hitch socket 44 settles down on top of ball 16 for connection therewith.

During off-loading, the post cable guide 22 is not used, and the cable 34 passes from the winch 36, through the tongue cable guide 40, over the pivotal arm cable guide 32, and is connected to the lower cable hook receiver 20. This way, when slack is taken out of the cable 34 by operating winch 36, the tongue 38 and trailer hitch socket 44 are pulled up off the ball 16. The pivotal arm 26 rotates rearwardly because it is not held forwardly by the cable 34 passing over the post cable guide 22. Then, when some slack is let into the cable 34, the pivotal arm 26 rotates further rearwardly, and tongue 38 and trailer hitch socket 44 settle down behind the ball 16.

Although this invention has been described above with reference to particular means, materials and embodiments, it is to be understood that the invention is not limited to these disclosed particulars, but extends instead to all equivalents within the scope of the following claims.

I claim:

1. A trailer hitch device of the ball and socket type, comprising:

a vertical post in front of and in close proximity to the ball, the post having a pivotal arm which can rotate from a vertical position to a rearwardly inclined position;

a first cable guide at or near the top surface of the vertical post; and, a second cable guide at or near the top surface of the pivotal arm.

2. The device of claim 1 which also comprises a receiver for a cable.

3. A trailer bitch device of the ball and socket type, comprising:

a vertical post in front of and in close proximity to the ball, the post having a pivotal arm which can rotate from a vertical position to a rearwardly inclined position;

a first cable guide at or near the top surface of the vertical post;

a second cable guide at or near the top surface of the pivotal arm; and a third cable guide in close proximity to the socket.

4. The device of claim 3 which also comprises a winch behind the third cable guide.

5. A method for operating a trailer hitch device of the ball and socket type, comprising:

lifting the socket relative to the ball by taking slack out of a cable passing through a cable guide in close proximity to the socket and over a cable guide on a pivotal arm connected to a vertical post in front of and in close proximity to the ball.

* * * * *